(12) United States Patent
Roque

(10) Patent No.: US 11,772,549 B2
(45) Date of Patent: Oct. 3, 2023

(54) REMOTE-CONTROL DEVICE AND METHOD FOR LOCATING A PARKED VEHICLE

(71) Applicant: Claudia Roque, Aurora, CO (US)

(72) Inventor: Claudia Roque, Aurora, CO (US)

( * ) Notice: Subject to any disclaimer, the term of this patent is extended or adjusted under 35 U.S.C. 154(b) by 0 days.

(21) Appl. No.: 17/696,953

(22) Filed: Mar. 17, 2022

(65) Prior Publication Data

US 2022/0297596 A1    Sep. 22, 2022

Related U.S. Application Data

(60) Provisional application No. 63/163,099, filed on Mar. 19, 2021.

(51) Int. Cl.
| | |
|---|---|
| *B60Q 1/48* | (2006.01) |
| *G08C 17/02* | (2006.01) |
| *G08B 7/06* | (2006.01) |
| *G08B 7/02* | (2006.01) |

(52) U.S. Cl.
CPC ............. *B60Q 1/482* (2013.01); *G08B 7/02* (2013.01); *G08B 7/06* (2013.01); *G08C 17/02* (2013.01); *G08C 2201/51* (2013.01); *G08C 2201/91* (2013.01)

(58) Field of Classification Search
CPC . B60Q 1/482; G08B 7/02; G08B 7/06; G08C 17/02; G08C 2201/51; G08C 2201/91
See application file for complete search history.

(56) References Cited

U.S. PATENT DOCUMENTS

| | | | | |
|---|---|---|---|---|
| 5,940,007 | A * | 8/1999 | Brinkmeyer | G07C 9/00817 340/5.23 |
| 6,363,324 | B1 * | 3/2002 | Hildebrant | G01C 21/26 342/357.31 |
| 2009/0115639 | A1 * | 5/2009 | Proefke | G08G 1/005 340/989 |
| 2010/0141412 | A1 * | 6/2010 | Partin | G08G 1/205 340/426.18 |
| 2015/0254980 | A1 * | 9/2015 | Mainini | G08G 1/123 340/988 |

* cited by examiner

*Primary Examiner* — Omeed Alizada
(74) *Attorney, Agent, or Firm* — Brennan, Manna & Diamond, LLC

(57) ABSTRACT

The present invention relates to a system and method using a remote-control device for locating a vehicle parked in a large parking area or structure. The system includes a RF transceiver, an LED light, and a vibration module installed in the vehicle during manufacturing or retrofitted to an existing vehicle. The remote-control device is configured to connect with the vehicle and illuminate the LED light remotely in order to locate the vehicle. The remote device can also vibrate in response to the proximity of the remote device relative to the vehicle using the vibration module. The remote-control device provides the capability to display GPS location of vehicle and the remote device while also enabling an audible recording of a description of the location of the vehicle.

19 Claims, 8 Drawing Sheets

REMOTE-CONTROL DEVICE AND METHOD FOR LOCATING A PARKED VEHICLE

CROSS-REFERENCE TO RELATED APPLICATION

The present application claims priority to, and the benefit of, U.S. Provisional Application No. 63/163,099, which was filed on Mar. 19, 2021 and is incorporated herein by reference in its entirety.

FIELD OF THE INVENTION

The present invention relates generally to the field of key fobs and remote-control devices. More specifically, the present invention relates to a system, method, and a remote-control device for locating a vehicle parked in a large parking area, lot, or garage. More specifically, the remote-control device is configured to selectively operate a light source disposed on the vehicle. The device further can be used to record vehicle location and to vibrate the vehicle. Accordingly, the present disclosure makes specific reference thereto. Nonetheless, it is to be appreciated that aspects of the present invention are also equally applicable to other like applications, devices, and methods of manufacture.

BACKGROUND

By way of background, malls, airports, and other large venues often feature large parking garages, lots, or tiered parking structures that make losing a vehicle particularly easy and finding a misplaced vehicle particularly challenging. Many drivers, at one time or another, have experienced difficulty in locating a vehicle that they had previously parked. Surveys have revealed that generally about one in seven drivers (i.e., about 14 percent) forget where they parked their vehicles and 55 percent of Americans have forgotten where they parked at least once. Individuals end up spending a considerable amount of time and effort in locating their vehicle in a large parking lot or garage which is not only time consuming but is also frustrating.

Generally, individuals take a photo of the floor name and parking spot number or put a sticker or any other identification mark on top of the vehicle for locating the vehicle. These manual methods are ineffective, and individuals often forget to take the photograph or put the identification mark on the vehicle.

Some individuals use a car alarm, horn chirp, or panic alarm that can be activated by a user remotely using a nomadic or remote key fob to locate the vehicle. However, locating a vehicle using a car alarm can be ineffective as a user may not be able to determine the direction from which the sound is coming and also the car alarm can create a disturbance or attract unwanted attention. Individuals desire a more effective means for locating their vehicle in a large parking lot or garage which is easy to use and does not create nuisance.

Some key fobs currently available are dependent upon a GPS based module. As a result of this GPS-dependency, such key fob devices may fail to operate properly in areas where satellite reception is poor or lacking.

Therefore, there exists a long-felt need in the art for a system that effectively locates a parked vehicle. There is also a long-felt need in the art for a vehicle location device that obviates the need for a user to remember vehicle location or taking a picture of a parking location. Additionally, there is a long-felt need in the art for a parked vehicle locator system that is easy to use and does not create disturbance. Moreover, there is a long-felt need in the art for a vehicle location system that is not dependent upon GPS and other satellite-based systems. Further, there is a long-felt need in the art for a vehicle security system that prevents the vehicle owners from being worried about a lost or misplaced vehicle in a large parking structure. Finally, there is a long-felt need in the art for a remote-control system that obviates the need for users to spend considerable time trying to find a vehicle parked in a parking structure.

The subject matter disclosed and claimed herein, in one embodiment thereof, comprises an electronic remote-control device for locating a vehicle parked in a parking lot or structure. The remote-control device includes a radio frequency (RF) transceiver configured to establish a RF channel with a parked vehicle; a voice recorder for recording a small voice message of a user; a speaker for playing out (i.e. replaying) the recorded voice message; a vehicle light controller configured to enable or actuate an LED light positioned on the vehicle; a vibration module configured for vibrating the remote-control device; a location detection module for detecting location of the device; a display screen for displaying location of device and location of the paired vehicle; and, a battery for providing power to the voice recorder, speaker, RF transceiver, vibration module, and display screen. The device includes a controller for performing machine readable instructions to execute operations of the remote-control device. The remote-control device is a part of a system wherein the LED light, vibration module, and a RF transceiver are installed in the vehicle.

In this manner, the novel remote-control device and associated system of the present invention accomplishes all of the forgoing objectives and provides a system that obviates the need for a user to remember vehicle location or taking a picture of parking location. Further, the remote-control system obviates the need for users to spend any considerable time trying to find a vehicle parked in a parking structure. The system is not dependent upon GPS signals but provides a plurality of ways to locate a vehicle.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an electronic remote-control device for locating a parked vehicle. The remote-control device comprising a radio frequency (RF) transceiver configured to establish a RF channel with a parked vehicle; a voice recorder for recording a small voice message of a user; a speaker for playing out (i.e., replaying) the recorded voice message; a vehicle light controller configured to enable or actuate an LED light positioned on the vehicle; a vibration module configured for vibrating the remote-control device; a location detection module for detecting location of the device; a display screen for displaying location of device and location of the paired vehicle; and, a battery for providing power to the voice recorder, speaker, RF transceiver, vibration module, and display screen. The device includes a controller for performing machine readable instructions to execute operations of the remote-control device.

In yet another embodiment, a method for locating a vehicle from a portable remote device is described. The method comprising the steps of: providing a RF transceiver, an LED light, and a vibration module in the vehicle; providing a RF transceiver, a voice recorder, a speaker and a GPS module in the portable remote device; transmitting a RF broadcast message from the RF transceiver of the portable remote device; receiving, by the portable remote device, a response from the RF transceiver of the vehicle; receiving, by the RF transceiver of the vehicle, a wireless instruction from the RF transceiver of the portable remote device for illuminating the LED light and activating the vibration module; and, activating the LED light and vibration module of the vehicle.

In yet another embodiment, a process carried out by a handheld remote-control device for locating a parked vehicle is described. The process comprising of recording a voice message including a description of a location of the parked vehicle; receiving an instruction for playing out (i.e., replaying) the recorded voice message; and playing out (i.e., replaying), by the speaker of the device, the recorded voice message describing the location of the parked vehicle.

In yet another embodiment, a process carried out by a handheld remote-control device for locating a parked vehicle is described. The process comprising of receiving an instruction for illuminating a light source disposed on the parked vehicle; transmitting a wireless instruction to the radiofrequency (RF) transceiver of the vehicle wherein the wireless instruction includes an encoded light illumination instruction; receiving an instruction for disabling the light source disposed on the parked vehicle; and, transmitting a wireless instruction to the radiofrequency transceiver of the vehicle wherein the wireless instruction includes an encoded light disabling instruction.

In yet another embodiment of the present invention, a parked vehicle location system is disclosed. The system includes a RF transceiver, an LED light and a vibration module installed in the vehicle; a remote-control device including a RF transceiver, a voice recorder, a vibration module, a speaker, and a GPS module; the remote-control device is paired with the vehicle through a RF channel. The remote-control device is further configured to remotely illuminate the LED light and vibrate the vibration module of the vehicle.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
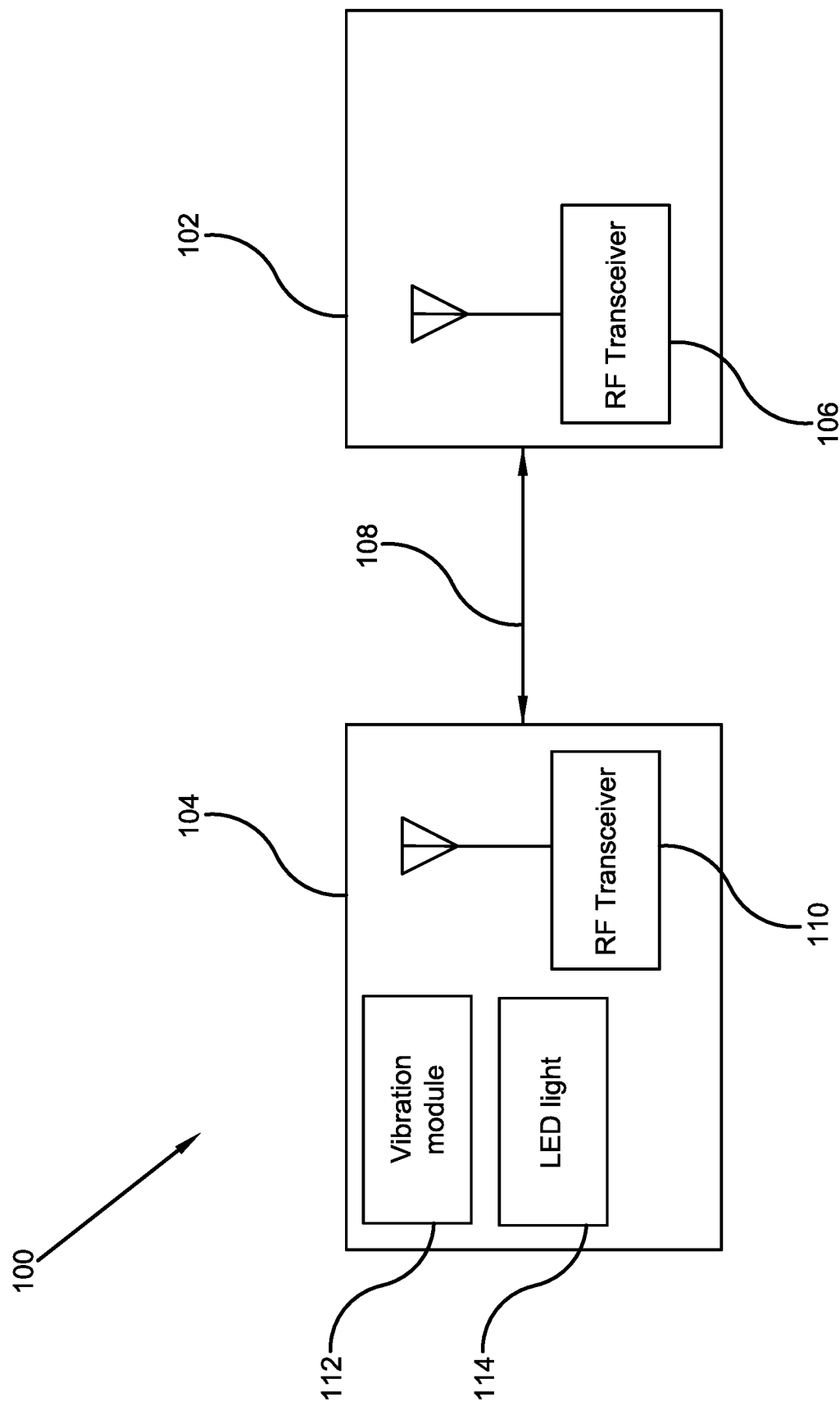
FIG. 1 illustrates a schematic view of one potential embodiment of a parked vehicle location system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It can be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments can be combined.

As noted above, there is a long-felt need in the art for a system that effectively locates a parked vehicle. There is also a long-felt need in the art for a vehicle location device that obviates the need for a user to remember a vehicle location or taking a picture of parking location. Additionally, there is a long-felt need in the art for a parked vehicle locator system that is easy to use and does not create disturbance. Moreover, there is a long-felt need in the art for a vehicle location system that is not dependent upon GPS and other satellite-based systems. Further, there is a long-felt need in the art for a vehicle security system that prevents the vehicle owners from being worried about a lost or misplaced vehicle in a large parking structure. Finally, there is a long-felt need in the art for a remote-control system that obviates the need for users to spend considerable time trying to find a vehicle parked in a parking structure.

The present invention, in one exemplary embodiment, is a novel method for locating a vehicle from and through a portable remote device. The method comprising the steps of: providing a RF transceiver, an LED light and a vibration module in the vehicle; providing a RF transceiver, a voice recorder, a speaker and a GPS module in the portable remote device; transmitting a RF broadcast message from the RF transceiver of the portable remote device; receiving, by the portable remote device, a response from the RF transceiver of the vehicle; receiving, by the RF transceiver of the vehicle, a wireless instruction from the RF transceiver of the portable remote device for illuminating the LED light and activating the vibration module; and activating the LED light and vibration module of the vehicle.

Referring initially to the drawings, FIG. 1 illustrates a schematic view of one potential embodiment of a parked vehicle location system 100 of the present invention in accordance with the disclosed architecture. The parked vehicle location system 100 of the present invention is designed to allow individuals to easily locate their vehicles parked in a parking structure. More specifically, the system 100 includes a lightweight remote-control device 102 that is configured to connect, pair, and communicate with a vehicle 104. The system 100 can be integrated into newer vehicles during the manufacturing process or alternatively can be retrofitted to an existing vehicle. A user such as a vehicle owner uses the remote-control device 102 to find and communicate with the paired parked vehicle 104 in a large parking lot or structure. Preferably, the remote-control device 102 is in the form of small key fob which is easy to carry, operate, and store.

The remote-control device 102 includes a built-in battery-operated Radio frequency (RF) transceiver 106 that establishes a wireless channel 108, preferably a RF channel with the RF transceiver 110 of the vehicle 104. It should be understood the remote-control device 102 includes a plurality of electronic components and sensors required for effective functioning of the system 100 and such components are described in FIGS. 4 & 5. The vehicle 104 further includes a vibration module 112 that can be operated or actuated remotely by the remote-control device 102 for vibrating the control device when proximal to the vehicle 104. The vehicle 104 also includes an LED light 114 disposed on an exterior of the vehicle 104 such that the light 114 can be selectively operated or actuated by the remote-control device 102. The RF transceiver 110, vibration module 112, and LED light 114 disposed on the vehicle 104 form a part of the system 100 of the present invention and are operable by the remote-control device 102.

The battery-operated Radio frequency (RF) transceiver 106 is configured to broadcast an interrogation signal which is received by the vehicle's RF transceiver 110 and a confirmation signal is received by the battery-operated RF transceiver 106 to establish the channel 108 and then the vibration module 112 and the LED light 114 are selectively operated or actuated (activated or deactivated) by the remote-control device 102.

The LED light 114 may illuminate in a variety of colors and is easily visible from long distances when activated. The LED light 114 may flash very fast or may also illuminate continuously as a conventional light. The vibration module 112 and the LED light 114 are coupled to the RF transceiver 110 and therefore, allows a user to remotely operate through the established wireless channel 108.

Figure 2:
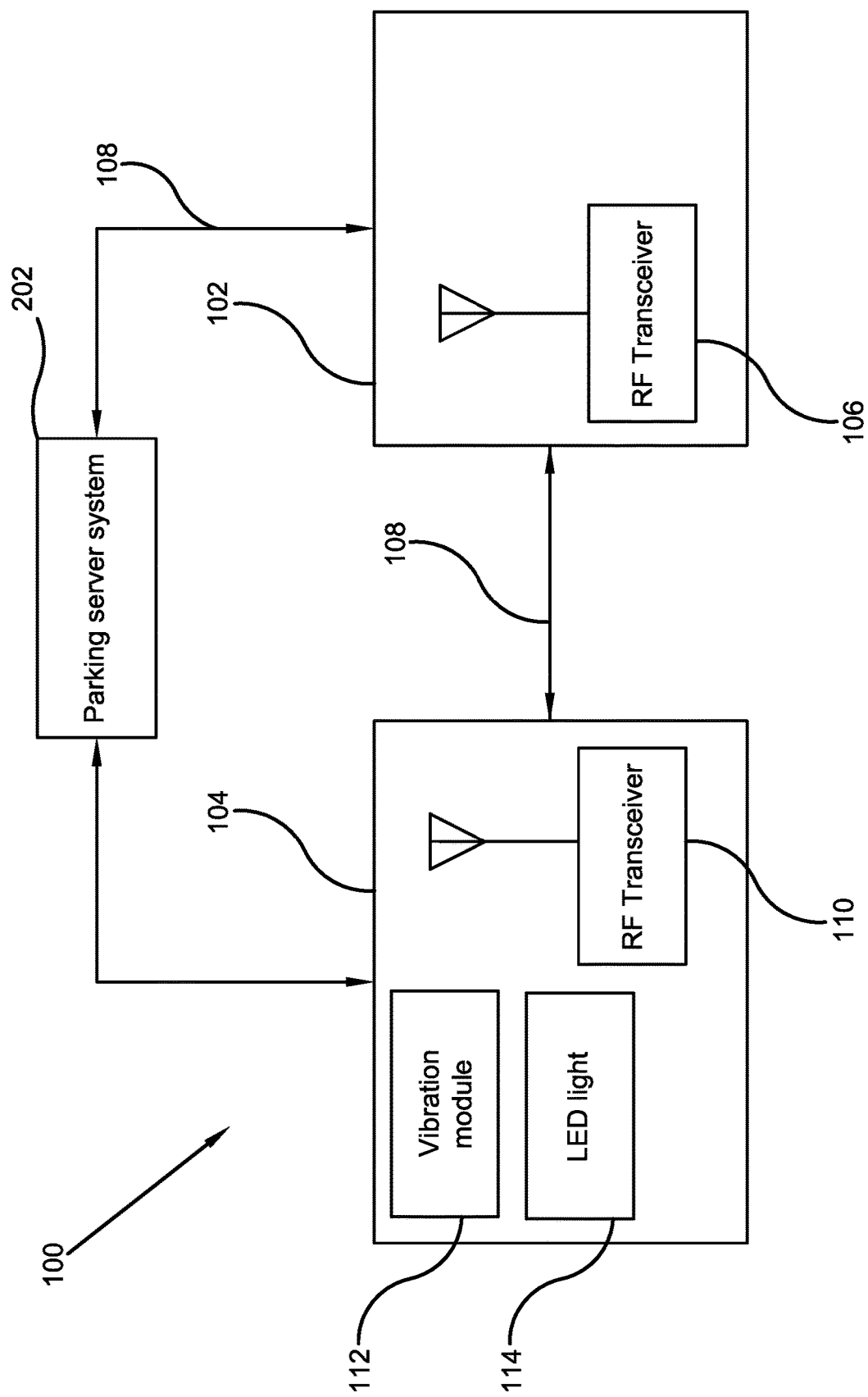
FIG. 2 illustrates a schematic view of another implementation of the parked vehicle location system of the present invention in accordance with the disclosed architecture.

FIG. 2 illustrates a schematic view of another implementation of the parked vehicle location system of the present invention in accordance with the disclosed architecture. In the system 200 of the present embodiment, the remote-control device 102 is configured to communicate with a parking server system 202 of the parking structure and is useful in cases of multilevel parking. Also, in cases, where a RF transceiver 110 of the vehicle 104 is unreachable to the remote-control device 102, then, the parking server 202 may communicate with the vehicle and relay information to the remote-control device 102.

In the present embodiment, the broadcast RF signal 108 transmitted from the remote-control device 102 is captured by the parking server 202 and a vehicle identifier is extracted from the signal. Then, the parking server 202 makes a wireless connection with the RF transceiver 110 of the vehicle 104 and may activate the LED light 114 or vibrate the vehicle using the vibration module 112. Also, the location of the vehicle 104 is detected by the parking server 202 and is relayed to the remote-control device 102 and the location is displayed on display screen of the remote-control device 102 as described in FIG. 4.

It should be noted that the remote-control 102 in the present embodiment may establish simultaneous wireless RF connection with the parking server 202 and the vehicle 104.

Figure 3:
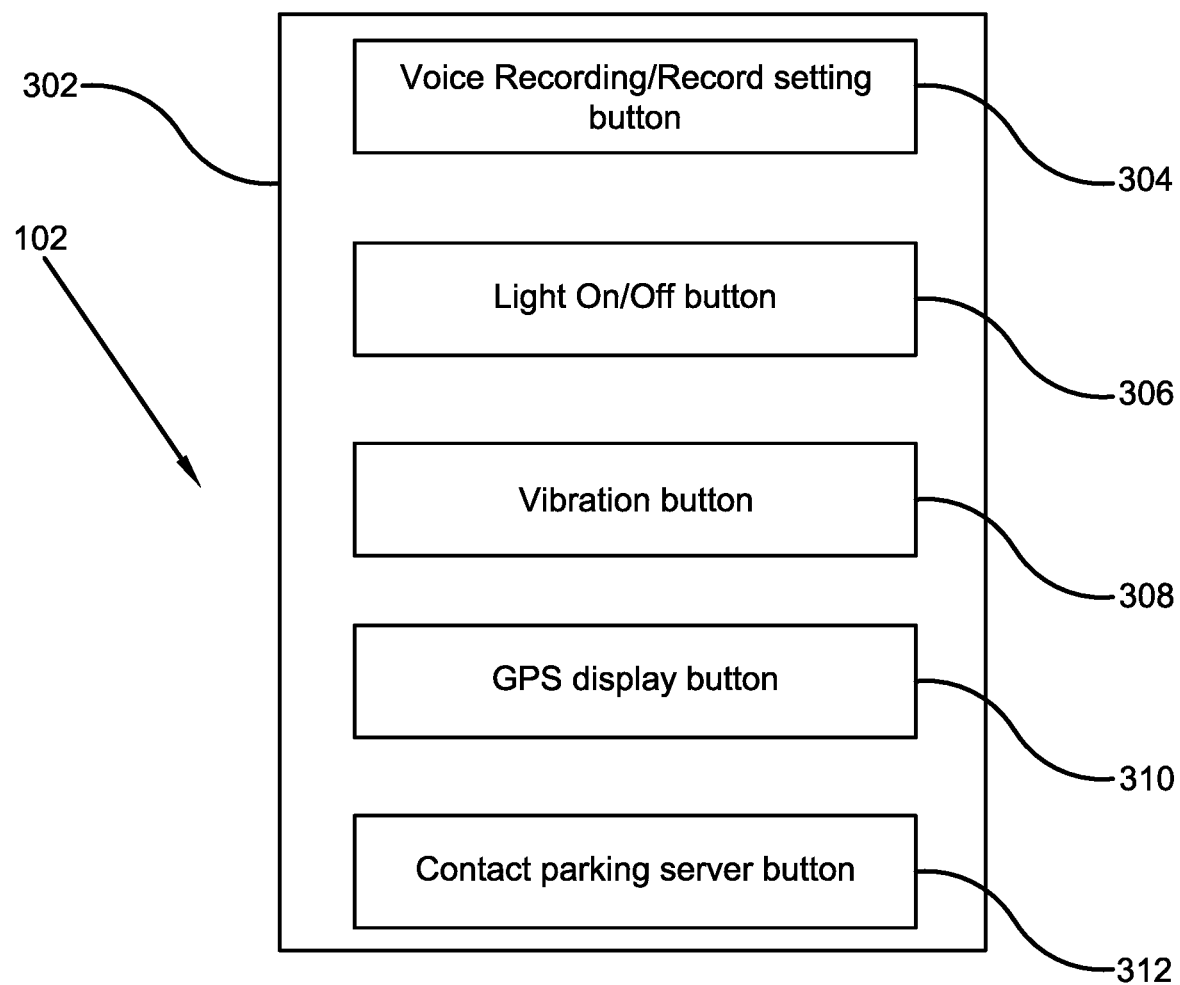
FIG. 3 illustrates a plan view of the remote-control device having a plurality of functions to locate a parked vehicle in accordance with the disclosed architecture.

FIG. 3 illustrates a plan view of the remote-control device 102 having a plurality of functions to locate a parked vehicle in accordance with the disclosed architecture. The remote-control device 102 is a lightweight and portable device in the form of a key fob or a small remote device and includes a housing 302. The housing 302 is weatherproof and may come in a variety of colors. A plurality of push buttons or touch buttons are disposed on an exterior surface of the housing 302 for enabling a user to remotely locate a parked vehicle.

A voice recording button 304 is used for recording a voice message of a maximum duration, for example, a duration of ten seconds. A user keeps pressing the voice recording button 304 for recording the vehicle location. Advantage of recording location of the vehicle is that the remote-control device 102 audibly 'plays back' the stored or parked location description using a built-in speaker. The voice recording is stored in an integrated storage or memory module of the remote-control device 102. A Light on button 306 is used for selectively activating the LED light disposed on the vehicle with which the remote-control device 102 is paired and electronically connected. The LED light is configured to be activated for a predetermined period when the Light on button 306 is pressed by the user.

A vibration button 308 disposed on the housing 302, when pressed by a user, activates the vibration module of the vehicle. The vibration of the vehicle helps the user in locating the vehicle parked at a location. A GPS display button 310, when pressed, is configured to display live GPS location of the remote-control device 102 and the vehicle. Live GPS coordinates are displayed on the display screen of the device 102 and can be used for reaching the vehicle and for closing the distance between the device 102 and the vehicle.

For the parking structures having a parking server compatible with the remote-control device 102, a contact parking server button 312 can be pressed and accordingly, the remote-control device 102 establishes a wireless channel with the parking server as described in FIG. 2.

During normal use of the remote-control device 102, the buttons remain stowed within housing 302. However, if remote-control device 102 ceases to operate properly (e.g., if the battery contained within remote-control device 102 becomes discharged), the buttons can be removed.

Figure 4:
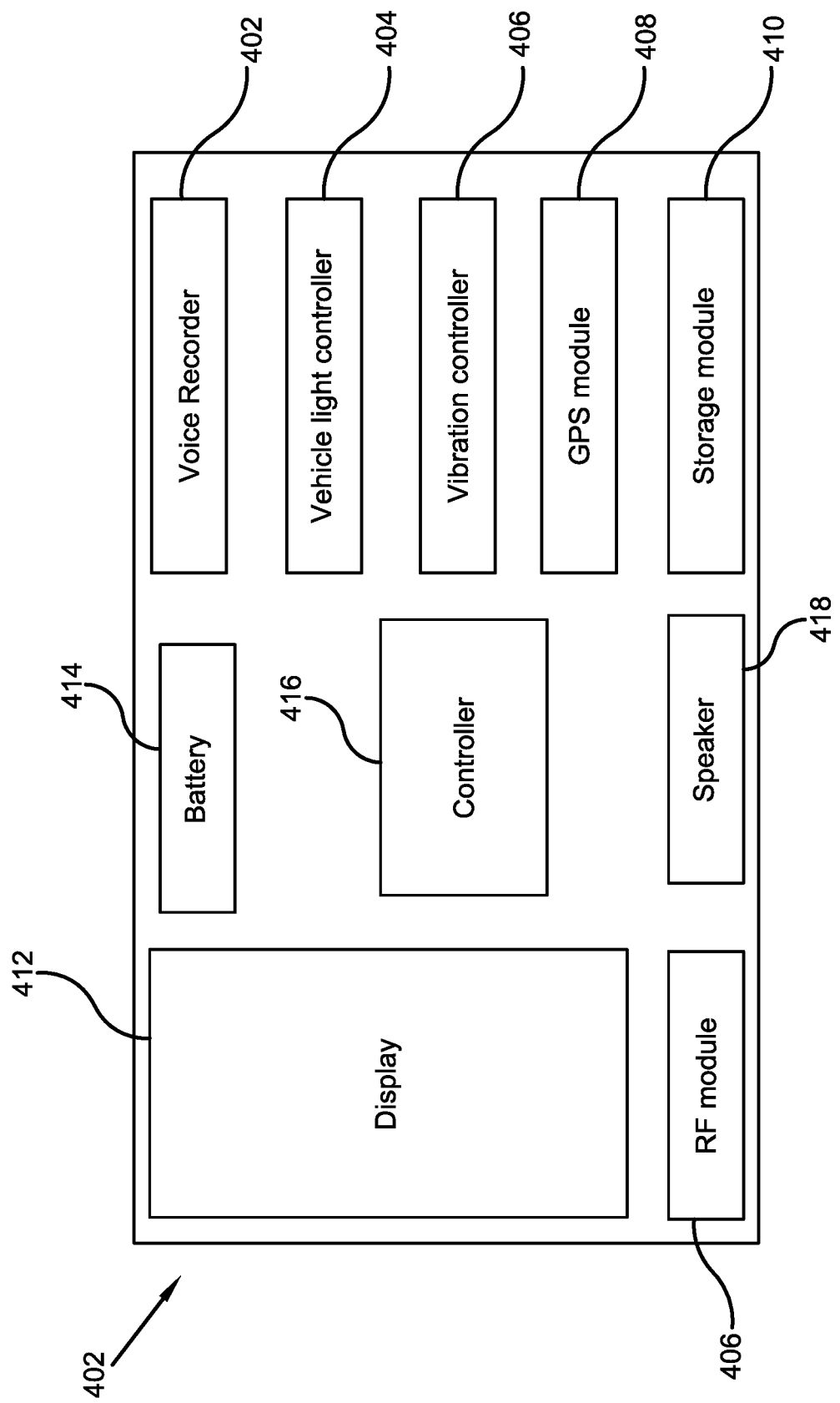
FIG. 4 illustrates a block diagram showing essential electronic components of the remote-control device of the present invention in accordance with the disclosed architecture.

FIG. 4 illustrates a block diagram showing essential electronic components of the remote-control device 102 of the present invention in accordance with the disclosed architecture. The device 102 includes a voice recorder 402 coupled to the voice recording button 304 and is used for recording the voice message of a user and stored in the memory module 410. The remote-control device 102 includes an internal memory or storage module 410 for storing the voice recordings. The memory 410 may include ROM, RAM, Flash, NVRAM or any other memory known in state of the art.

A vehicle light controller 404 is embedded in the device 102 and is used for generating an instruction to activate the LED light disposed on the vehicle. A vibration controller 406 is used for vibrating the remote-device 102 when the remote-device 102 is near to the paired vehicle. In one embodiment, the vibration of the device 102 increases as the remote-control 102 reaches closer to the vehicle. A GPS module 408 is used for detecting GPS coordinates of the remote-control device 102. The GPS module 408 uses satellite communication for detecting GPS coordinates of the device 102. A display 412 is positioned on the housing of the remote-control device and is used for displaying GPS coordinates of the device 102 and of the vehicle 104. An integrated speaker 418 is used for audibly 'playing out (i.e., replaying)' the recorded voice messages in the internal memory 410 of the device 102.

A controller 416 is configured to control operations of the remote-control device 102 and transmits an instruction through the RF module 106 of the device 102. The controller 416 can be a microprocessor or microcontroller and is configured to execute machine-readable instructions. The controller 416 can be a single chip applications processor and is further connected to internal memory 410 in any suitable manner.

An integrated battery 414 is used for providing power to the components of the device 102. The battery is rechargeable and replaceable. The battery 414 is protected by a battery cover (not shown) positioned on the rear surface of the remote-control device 102.

Figure 5:
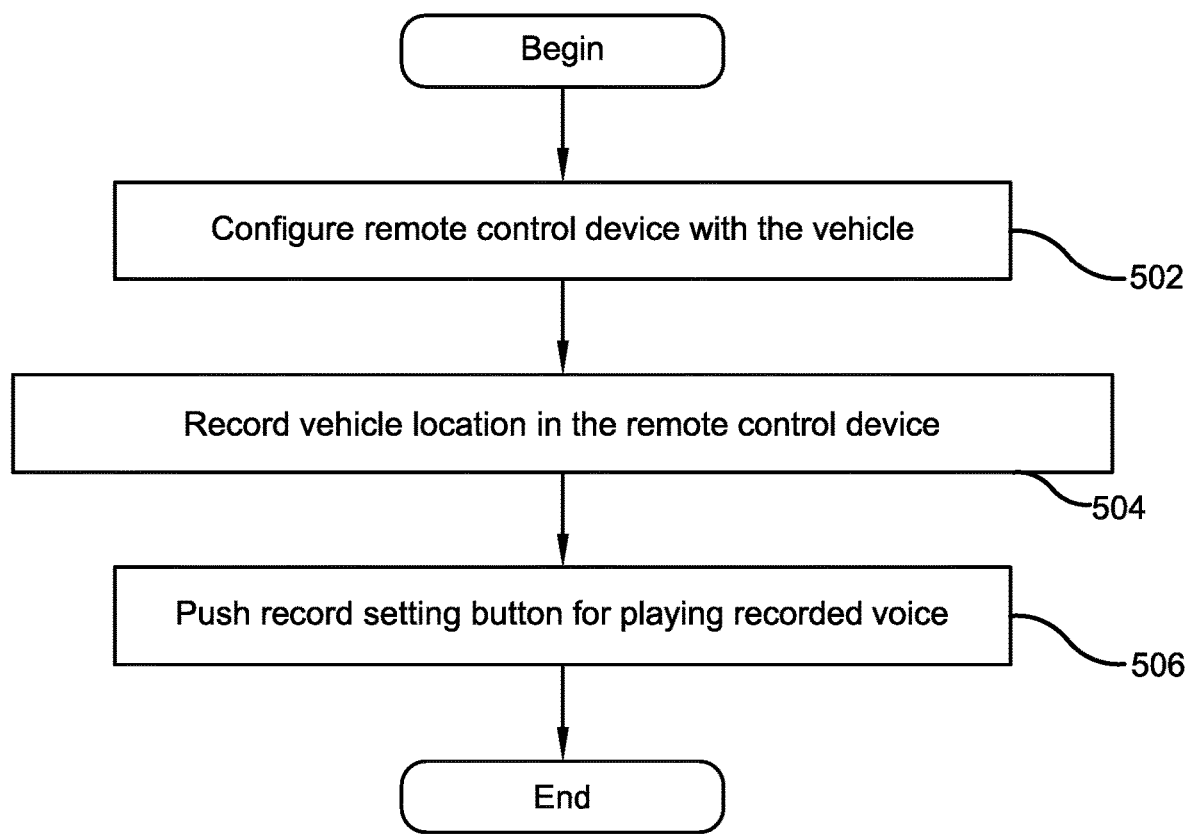
FIG. 5 illustrates a flow diagram depicting a process of recording and playing out (i.e., replaying) a location of a parked vehicle in the remote-control device of the present invention in accordance with the disclosed architecture.

FIG. 5 illustrates a flow diagram depicting a process of recording and audibly replaying out (i.e., replaying) the location of a parked vehicle in the remote-control device of the present invention in accordance with the disclosed architecture. As shown, initially, remote-control device is paired or configured to connect with a vehicle (Step 502). It is to be appreciated that this step can be performed by a manufacturer of the vehicle and remote device or can also be performed by a user of the remote-control device when the system of the present invention is retrofitted to the vehicle. Then, by pressing the record setting button of the remote-control device, vehicle location is recorded by a user (Step 504). Then, for locating the vehicle, the record setting button is again pushed enabling the speaker of the device to replay the stored or parked location description of the vehicle (Step 506). It should be noted that a small voice message of a predeterminable duration (i.e., up to ten seconds) can be recorded in the device 102.

Figure 6:
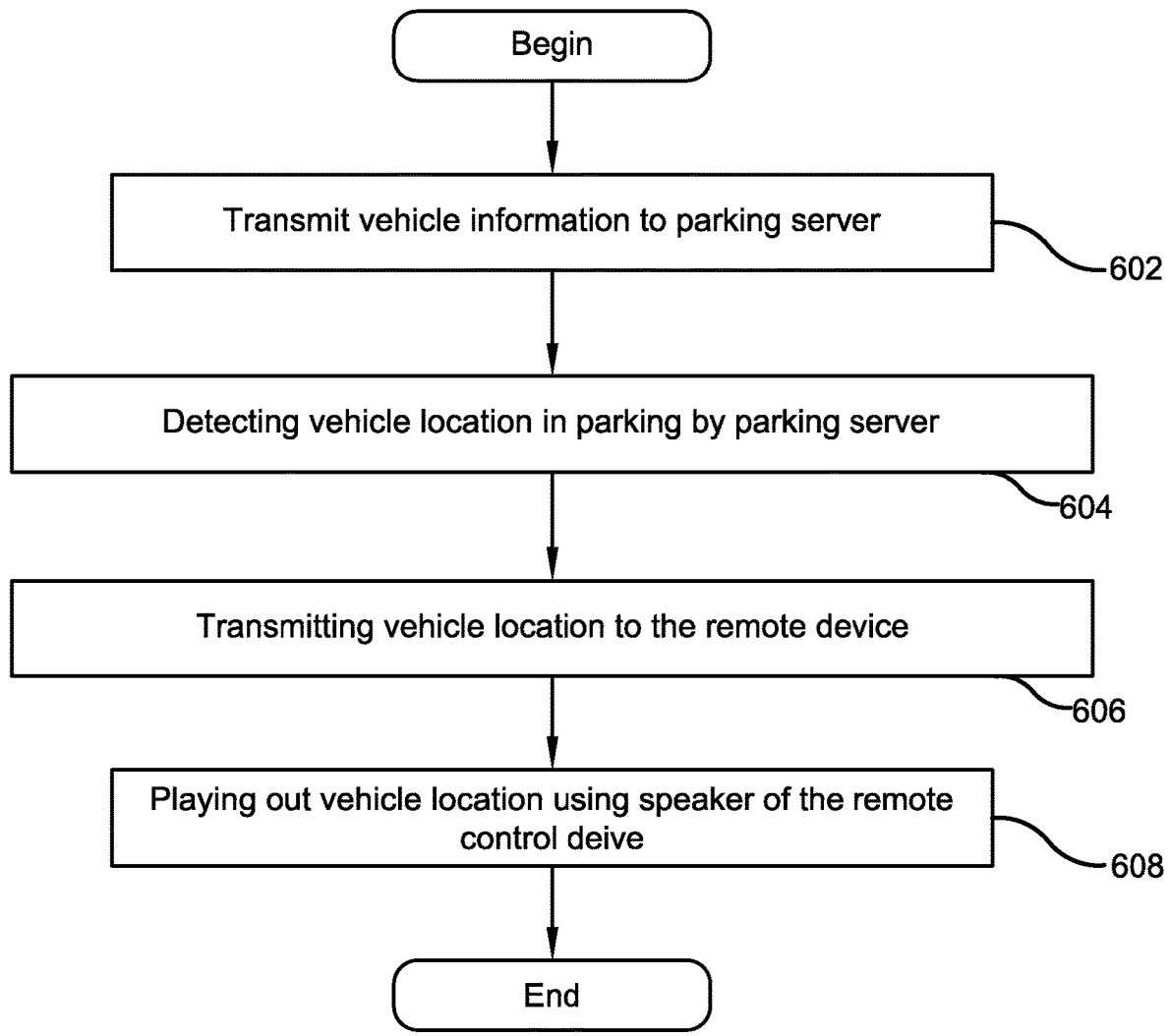
FIG. 6 illustrates a flow diagram depicting a process of communication between the remote-control device and the parking server of FIG. 2 in accordance with the disclosed architecture.

FIG. 6 illustrates a flow diagram depicting a process of communication between the remote-control device 102 and the parking server 202 of FIG. 2 in accordance with the disclosed architecture. Initially, a wireless channel is established between the remote-control device 102 and the parking server 202 and vehicle information (such as license plate number) is transmitted to the parking server (Step 602). Then, the vehicle location in the parking lot or structure is detected by the parking server (Step 604). Thereafter, the vehicle location is transmitted from the parking server to the remote device (Step 606). Finally, the received vehicle location is replayed from the speaker of the remote device (Step 608).

Figure 7:
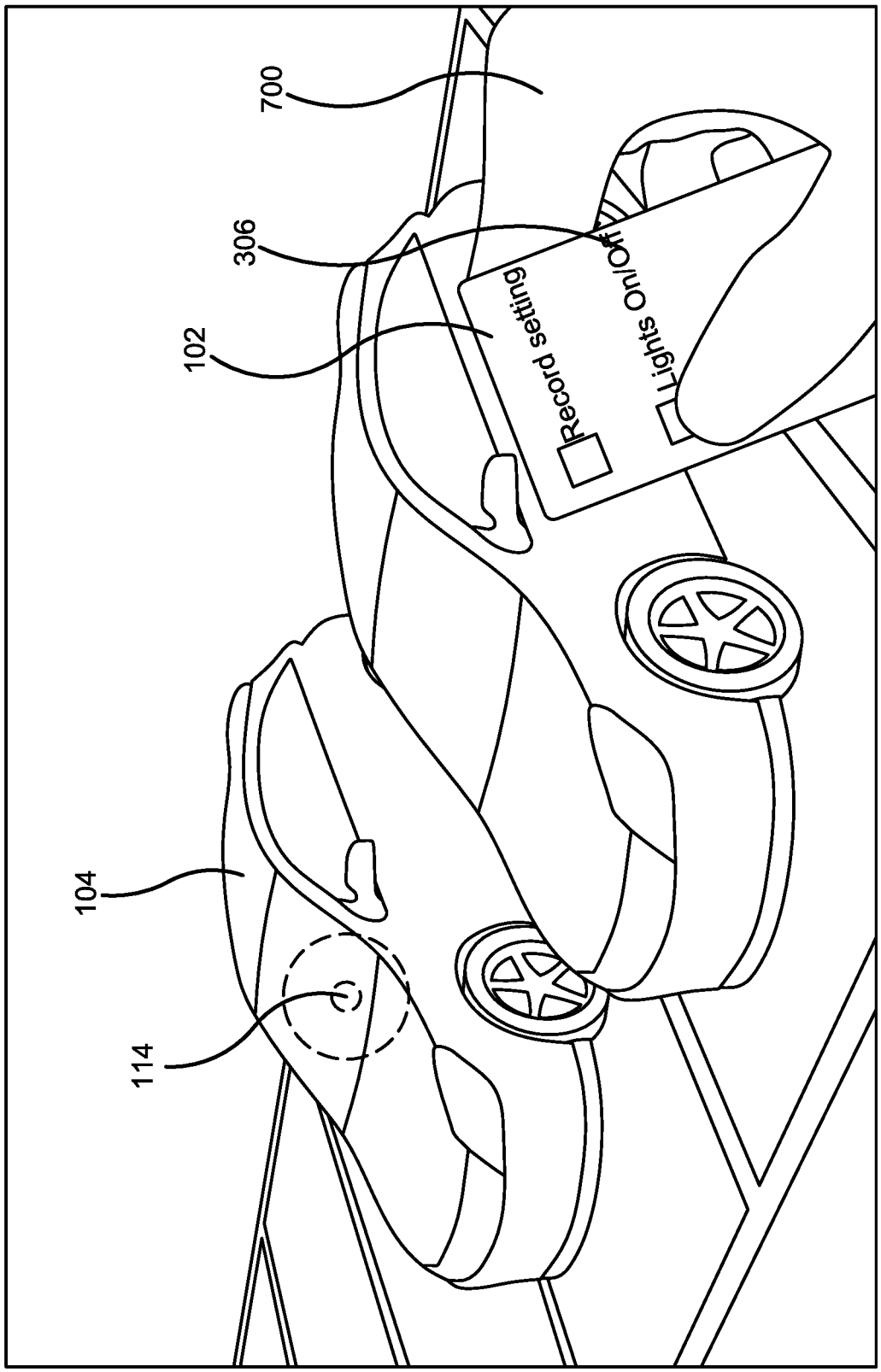
FIG. 7 illustrates a perspective view showing selectively activating the LED light disposed on the vehicle using the remote-control device in accordance with the disclosed architecture.

FIG. 7 illustrates a perspective view showing selectively activating the LED light disposed on the vehicle 104 using the remote-control device 102 in accordance with the disclosed architecture. On pressing the Light On/Off button 306 of the remote device 102 by a user 700, the LED light 114 disposed on the vehicle 104 is instantly activated and illuminated brightly allowing the user 700 to easily locate the vehicle 104 even from a large distance. The Light On/Off button 306 can also be used for deactivating the LED light 114 based on the requirement and preference of the user 700.

Figure 8:
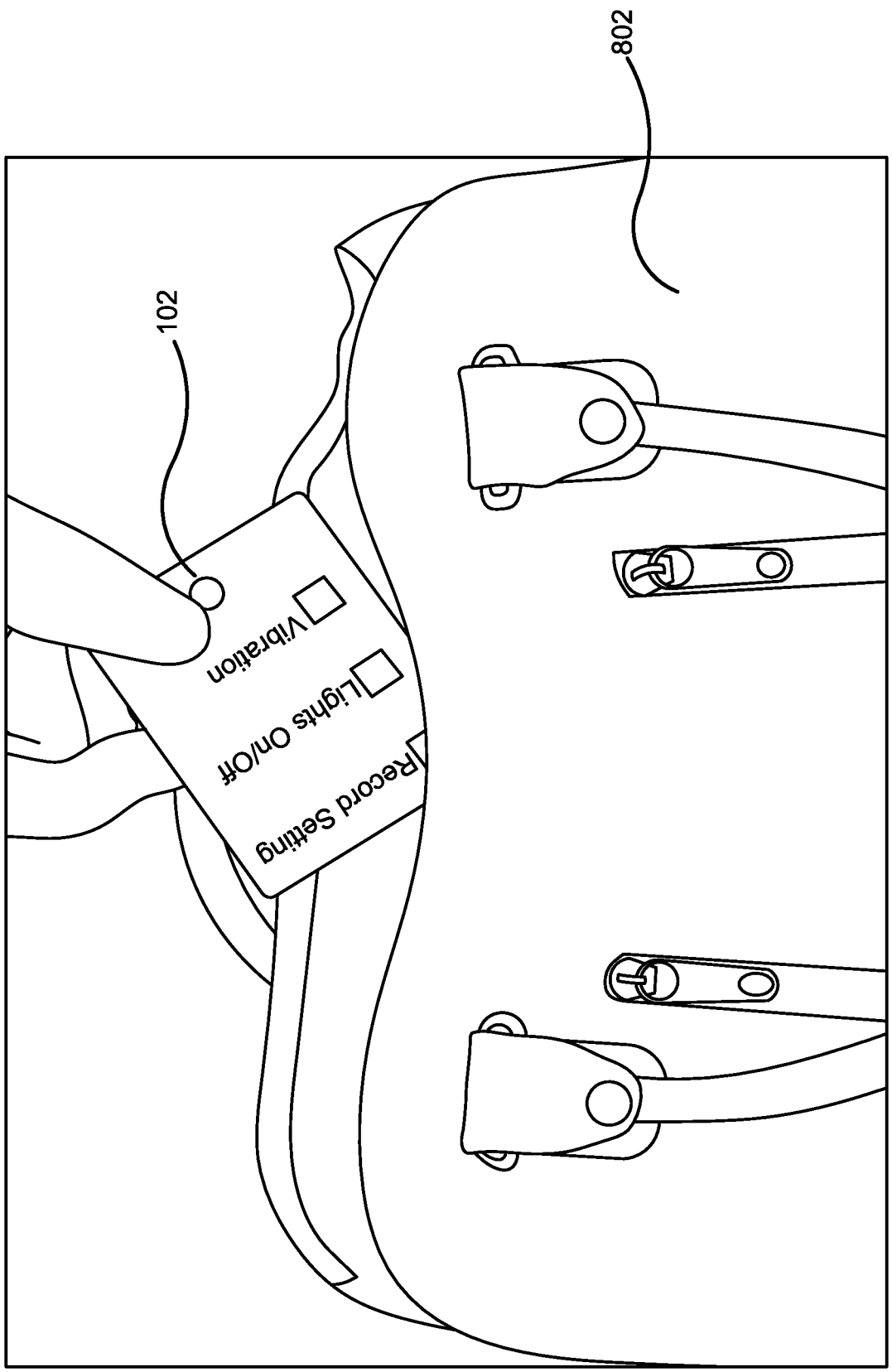
FIG. 8 illustrates a perspective view showing how the remote can easily fit into a purse or pocket in accordance with the disclosed architecture.

FIG. 8 illustrates a perspective view showing how the remote 102 can easily fit into a purse in accordance with the disclosed architecture. As stated earlier, the remote device 102 is lightweight, portable and can be easily handled and carried by a user. As shown, the exemplary remote device 102 is small and compact in size and can be easily stored in the purse 802, thus, eliminating chances of losing the remote 102 easily.

In view of the above, it should be appreciated that the parked vehicle location system 100,200 and the remote-control device 102 have been provided for guiding a user back to his or her vehicle. It should also be understood that, in certain embodiments, the remote device 102 may determine the location of the parked vehicle 104 by wirelessly querying the vehicle after activation of the vehicle location function in the well-known manner. Further, the parked vehicle location system 100 and the parked vehicle locating remote-control device 102 may be integrated into newly manufactured vehicles or manufactured and installed as an aftermarket item.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "remote-control device", "remote device", "key fob", and "remote" are interchangeable and refer to the parked vehicle locating remote-control device 102 of the present invention. Similarly, as used herein "parked vehicle location system" and "system" are interchangeable and refer to the parked vehicle location system 100 of the present invention.

Notwithstanding the forgoing, the parked vehicle location system 100 and the parked vehicle locating remote-control device 102 of the present invention can be of any suitable size and configuration as is known in the art without affecting the overall concept of the invention, provided that it accomplishes the above stated objectives. One of ordinary skill in the art will appreciate that the parked vehicle location system 100 and the parked vehicle locating remote-control device 102 as shown in the FIGS. are for illustrative purposes only, and that many other sizes and shapes of the parked vehicle location system 100 and the parked vehicle locating remote-control device 102 are well within the scope of the present disclosure. Although the dimensions of the parked vehicle location system 100 and the parked vehicle locating remote-control device 102 are important design parameters for user convenience, the parked vehicle location system 100 and the parked vehicle locating remote-control device 102 can be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A parked vehicle location system comprising:
   a control device configured to connect and communicate with a vehicle located remotely from said control device;
   said control device includes a built-in battery-operated Radio frequency (RF) transceiver for establishing a wireless channel with a RF transceiver of the vehicle, a sensor for detecting a proximity between said control device and the vehicle, a vibration module for vibrating said control device, an LED light disposed on an exterior of the vehicle, and a plurality of removable push buttons disposed on an exterior surface of the control device for selectively activating and deactivating the vibration module and the LED light;
   wherein said battery-operated RF transceiver configured to broadcast an interrogation signal which is received by said RF transceiver of the vehicle and a confirmation signal is received by said battery-operated RF transceiver to establish said wireless channel;
   wherein said LED light is selectively actuated by said control device; and
   further wherein said vibration module vibrates when said battery-operated RF transceiver is proximal to said RF transceiver of the vehicle.

2. The parked vehicle location system of claim 1, wherein said LED light illuminates in a selected color from a variety of colors.

3. The parked vehicle location system of claim 2, wherein said LED light is a flashing light.

4. The parked vehicle location system of claim 1, wherein said control device is a key fob.

5. The parked vehicle location system of claim 1, wherein said control device includes a voice recording button for recording an audible voice message including an audible description of the vehicle location.

6. The parked vehicle location system of claim 5, wherein said control device includes a speaker for audibly replaying said description of the vehicle location.

7. The parked vehicle location system of claim 6, wherein said control device includes a memory module for storing said description of the vehicle location.

8. The parked vehicle location system of claim 6, wherein said control device includes a GPS module and a display screen configured to display a live GPS location of said remote-control device and a live GPS location of the vehicle.

9. A parked vehicle location system comprising:
   a control device configured to record includes a voice recording button for recording an audible voice message including an audible description of a vehicle's parked location;
   wherein said control device includes a speaker for audibly replaying said description of the vehicle location; and
   wherein said control device includes a memory module for storing said description of the vehicle location;
   wherein said control device configured to connect and communicate with the vehicle located remotely from said control device;
   wherein said control device further includes a built-in battery-operated Radio frequency (RF) transceiver for establishing a wireless channel with a RF transceiver of the vehicle, a sensor for detecting a proximity between said control device and the vehicle, a vibration module for vibrating said control device, and an LED light disposed on an exterior of the vehicle; and
   wherein the control device further comprises a plurality of control buttons configured to operate the vibration module, the LED light, and the audible voice message, and further wherein the plurality of control buttons are removable from a housing of the control device when a battery of the control device is discharged.

10. The parked vehicle location system of claim 9, wherein said battery-operated RF transceiver configured to broadcast an interrogation signal which is received by said RF transceiver of the vehicle and a confirmation signal is received by said battery-operated RF transceiver to establish said wireless channel.

11. The parked vehicle location system of claim 10, wherein said LED light is selectively actuated by said control device, and further wherein said vibration module vibrates when said battery-operated RF transceiver is proximal to said RF transceiver of the vehicle.

12. The parked vehicle location system of claim 11, wherein said LED light illuminates in a selected color from a variety of colors.

13. The parked vehicle location system of claim 12, wherein said LED light is a flashing light.

14. The parked vehicle location system of claim 13, wherein said control device is a key fob.

15. The parked vehicle location system of claim 10, wherein said control device includes a GPS module and a display screen configured to display a live GPS location of said remote-control device and a live GPS location of the vehicle.

16. A parked vehicle location system comprising:
   a parking server system of a parking structure; a control device configured to connect and communicate with a vehicle located remotely from said control device and to connect and communicate with the parking server system of a parking structure; and
   a plurality of removable push buttons disposed on an exterior surface of the control device for selectively activating and deactivating a vibration module and a LED light;
   wherein said control device includes a built-in battery-operated Radio frequency (RF) transceiver for establishing a wireless channel with a RF transceiver of the vehicle and with a RF transceiver of said parking server system, and a contact parking server system button configured to allow the control device to broadcast an RF signal requesting a permission to establish contact with the parking server system and set up a relay between the vehicle and the parking server system via the control device over the wireless channel;

wherein said parking server system communicates with the vehicle and said control device via the relay between the vehicle and the parking server system over the wireless channel once accepting the request from the control device; and wherein said parking server system actuates the LED light on the vehicle via the relay between the vehicle and the control device.

17. The parked vehicle location system of claim 16, wherein said control device includes a voice recording button for recording an audible voice message including an audible description of the vehicle location.

18. The parked vehicle location system of claim 17, wherein said control device includes a speaker for audibly replaying said description of the vehicle location.

19. The parked vehicle location system of claim 18, wherein said control device includes a memory module for storing said description of the vehicle location.

* * * * *